United States Patent
Chellappa et al.

(10) Patent No.: US 7,539,176 B1
(45) Date of Patent: May 26, 2009

(54) SYSTEM AND METHOD FOR PROVIDING LINK, NODE AND PG POLICY BASED ROUTING IN PNNI BASED ATM NETWORKS

(75) Inventors: Mahesh Chellappa, San Jose, CA (US); Chandrasekar Krishnamurthy, Sunnyvale, CA (US); Stephen Eugene Morrow, San Jose, CA (US); Carlos M. Pignataro, Raleigh, NC (US); Krishna Sundaresan, Sunnyvale, CA (US)

(73) Assignee: Cisco Technology Inc., San Jose, CA (US)

( * ) Notice: Subject to any disclaimer, the term of this patent is extended or adjusted under 35 U.S.C. 154(b) by 636 days.

(21) Appl. No.: 10/817,253

(22) Filed: Apr. 2, 2004

(51) Int. Cl.
*H04L 12/28* (2006.01)

(52) U.S. Cl. .................. 370/351; 370/401; 370/253; 370/392; 370/389; 370/235; 370/408; 370/230; 370/537

(58) Field of Classification Search .......... 370/408, 370/230, 537, 235, 389, 392, 253, 401
See application file for complete search history.

(56) References Cited

U.S. PATENT DOCUMENTS

| | | | |
|---|---|---|---|
| 5,533,009 A | 7/1996 | Chen | |
| 5,953,338 A | 9/1999 | Ma et al. | |
| 6,243,384 B1 * | 6/2001 | Eriksson et al. | 370/395.31 |
| 6,272,139 B1 | 8/2001 | Soncodi | |
| 6,400,681 B1 * | 6/2002 | Bertin et al. | 370/218 |
| 6,456,600 B1 | 9/2002 | Rochberger et al. | 370/255 |
| 6,473,408 B1 * | 10/2002 | Rochberger et al. | 370/255 |
| 6,560,242 B1 | 5/2003 | Hamedani et al. | |
| 6,654,701 B2 * | 11/2003 | Hatley | 702/122 |
| 6,697,333 B1 | 2/2004 | Bawa et al. | |
| 6,714,544 B1 | 3/2004 | Bosloy et al. | |
| 6,741,585 B1 * | 5/2004 | Munoz et al. | 370/352 |
| 6,778,495 B1 * | 8/2004 | Blair | 370/230 |
| 6,836,464 B2 | 12/2004 | Igarashi et al. | |
| 6,922,409 B1 | 7/2005 | Medhat et al. | |

(Continued)

OTHER PUBLICATIONS

The ATM Forum, Private Network-Network Interface Specification Version 1.1 (PNNI 1.1), Apr. 2002, http://www.ipmplsforum.org/ftp/pub/approved-specs/af-pnni-0055.001.pdf.

(Continued)

*Primary Examiner*—Edan Orga
*Assistant Examiner*—Wutchung Chu
(74) *Attorney, Agent, or Firm*—Stolowitz Ford Cowger, LLP

(57) ABSTRACT

A system and method for providing link, node, and PG policy based routing in PNNI based ATM networks is disclosed. A computer implemented method signals and routes a call in the network. Upon detecting the call's arrival, its service request is accessed. Upon determining that the service request relates to an attribute of a link, a routing path is sought that conforms to the service request, as by accessing information relating to the routing path and comparing the information to the service request. A conforming routing path is selected, and the call is routed via that path. A computer implemented method advertises an attribute of links, nodes, policies, etc. Data relating to the route's attribute can be provided to a node as a GAT IE component of a PNNI signaling setup message for multi-peer group networks, and advertised using PTSEs within a peer group.

10 Claims, 8 Drawing Sheets

U.S. PATENT DOCUMENTS 6,934,249 B1 * 8/2005 Bertin et al. .................. 370/218
6,968,394 B1 * 11/2005 El-Rafie ...................... 709/245
2002/0009088 A1 1/2002 Donaghey et al.
2003/0081608 A1 * 5/2003 Barri et al. .................. 370/392
2003/0118025 A1 6/2003 Lee
2005/0129024 A1 * 6/2005 Fisher et al. ............. 370/395.1

OTHER PUBLICATIONS

The ATM Forum Technical Committee, "PNNI Addendum for Generic Application Transport, Version 1.0", Jul. 1999.

* cited by examiner

SYSTEM AND METHOD FOR PROVIDING LINK, NODE AND PG POLICY BASED ROUTING IN PNNI BASED ATM NETWORKS

TECHNICAL FIELD

Embodiments of the present invention relate to the field of network connection management. More specifically, embodiments of the present invention relate to a system and method for providing link, node, and PG policy based routing in PNNI based ATM networks.

BACKGROUND

Asynchronous Transfer Mode (ATM) technology is used as a backbone technology for some modern carrier networks. ATM supports network transmission of information including data as well as real-time voice and video. Networks employing ATM are typically characterized by a topology wherein network switches establish a logical circuit from one end of the network to another.

This topology functions to effectively guarantee Quality of Service (QoS) for the information transmitted over the ATM network. Inherent flexibility and efficiency typify ATM networks because unused bandwidth within the logical circuits therein can be appropriated when needed. For instance, idle bandwidth in an ATM circuit supporting a videoconference can be used to transfer bursts of data.

QoS specificity allows smooth ATM transmission of real-time critical information such as voice and video by providing a constant bit rate (CBR) to guarantee them sufficient bandwidth. Unspecified bit rate (UBR) provides a best effort for transmission of non-critical data. Applications that require minimal delay (e.g., interactive media), and bursty transaction traffic are respectively supported by real-time and non-real-time variable bit rate (rt-VBR and nrt-VBR).

ATM standards define the Private Network-to-Network Interface (PNNI) as the routing protocol for ATM networks. The PNNI protocol is a source routed protocol that allows network switches inform one another with data relating to the topology characterizing the network. This allows the network switches to intelligently make forwarding and other routing decisions, based on the information about the network topology. PNNI thus supports decision making for routing data traffic between a source node and a destination node through a link (or multiple links) in an ATM network.

Like the Open Shortest Path First (OSPF) protocol, an interior gateway protocol (IGP) that tries to optimize routing for Internet Protocol (IP) traffic over a Transfer Control Protocol/Internet Protocol network, upon which it is based, PNNI can route traffic in an ATM network based on cost metrics. In contrast to OSPF however, PNNI can further base routing decisions on other metrics, such as line capacities and delays, among other factors. The PNNI standard defines several metrics and attributes for selecting routing from a particular source to a particular destination, for each link to be traversed.

PNNI based metrics for selecting routing between a source and node for each link traversed can include administrative weight, which is a user configured value based on a network user's own programming. The PNNI based metrics can also include cell delay variation, which is based on the load carried by a particular link, or a statistically defined value based on link characteristics.

Such characteristics can include the speed at which the link operates and/or the buffering capability, e.g., the amount of buffer available at a node for storing the incoming data cells associated with the link. Further, the PNNI based metrics can include cell transfer delay, which can also be based on the link's load, and/or upon the characteristics of link speed and/or buffer capacity. PNNI standard based link attributes include a cell loss priority of zero (0), a cell loss priority of (0+1), a cell rate margin, and a variance factor.

These various characteristics can be affected by other attributes of the link, such as the link's basis, type, etc. For instance, the characteristics can differ between links that are satellite based and those that are terrestrial, and between encrypted links and those that are unencrypted. Some links comprise virtual trunks, with their own unique characteristics. Links that utilize public network infrastructure (e.g., facilities, lines, equipment, etc.) can differ characteristically from links that utilize private, dedicated infrastructure. These instances exemplify other link attributes that can affect indicate speed, delay, security, cost, and other link characteristics.

Users of ATM networks can prefer to route their calls and data via links of various types and basis's. Some users prefer to route calls over certain types of links and not over others and this may vary depending upon the type of call. Thus, ATM network users can attempt to manage their links and routing efficiently and/or cost effectively.

For example, in defense related (as well as certain commercial, business related, and other) networking applications, it may be specified that data traverse only encrypted links, e.g., for the heightened security they provide. Network applications, such as those that support the transfer of real time data, can be sensitive to delay and such applications may prefer to avoid satellite based links, because delay may be an unwelcome characteristic thereof, as compared to an exemplary terrestrial link.

Further, some PNNI networks operate with node policies and/or peer group (PG) policies, also known as coloring. These node and/or PG policies can provide input in making routing decisions. Node policies can be helpful in PNNI networks. For instance, a PNNI node can have multiple available PNNI links (some can have many, e.g., over 100), as well as PG policies.

Conventionally, routing through a PNNI network can be achieved on the basis of, for example, delay, cost, etc. However, routing on the basis of delay, for example, removes the capacity to route on the basis of cost.

SUMMARY

A system and method for providing link, node, and PG policy based routing in PNNI based ATM networks is disclosed. An embodiment of the present invention provides a computer based system for routing a call in a network according to a characteristic of a link comprising the network. Upon detecting the call's arrival, the system handles the call by comparing a service request of the call to information relating to a characteristic of a link, which is stored (e.g., in a database), finding a link conforming to the service request, and routing the call via the conforming link. The system also functions to advertise the information to another node within the network. In one embodiment, the information comprises a general application transport (GAT) information element (IE) and/or a PNNI topology state element (PTSE). The network comprises, in one embodiment, a private network to network interface (PNNI) asynchronous transfer mode (ATM) network.

An embodiment of the present invention provides a computer implemented method for signaling and routing a call in a network. Upon detecting the call's arrival, a service request of call is accessed. Upon determining that the service request relates to an attribute of a link comprising the network, a routing path is sought that conforms to the service request. A conforming routing path is selected, and the call is routed via the selected routing path. In one embodiment, seeking the conforming routing path comprises accessing and examining information relating to the link and comparing the information to the service request. The routing path can comprise a plurality of links and can span the network.

The attribute can comprise any characteristic of the link, such as a capability thereof, a characteristic of a node comprising the link, and a peer group policy. The attribute can relate to any such characteristic, type, capability, etc., and can relate to encryption, to basing (e.g., the link is a satellite based link, or the link is terrestrially based, etc.), to public nature (e.g., the link is a public link, or the link is a private link, etc.), to quality of service (QoS) capability (e.g., the link provides a constant bit rate, or the link is only capable of providing an unspecified bit rate), the link comprises a virtual trunk, etc.

An embodiment of the present invention provides a computer implemented method for advertising a route for a call in a network according to an attribute of the route. Upon accessing and examining information relating to a link comprising the route, an attribute relating to that route, such as a link, node, or peer group comprising that route or a policy relating to the route, is determined. Data relating to the attribute is provided to a node of the network, such as by generating a statement describing the attribute and sending the statement such as a GAT IE to the node, such as where the network comprises a PNNI ATM network, for instance, as a component of a PNNI signaling setup message.

The attribute advertised can relate to any such characteristic, type, capability, etc., and can relate to encryption, to basing (e.g., the link is a satellite based link, or the link is terrestrially based, etc.), to public nature (e.g., the link is a public link, or the link is a private link, etc.), to quality of service (QoS) capability (e.g., the link provides a constant bit rate, or the link is only capable of providing an unspecified bit rate), the link comprises a virtual trunk, etc. The advertised information can be added to a persistent network topology database by PNNI PTSE. In one embodiment, the methods for signaling and routing a call and for advertising a route in a network can be performed by a computer system under the control of computer readable code, as encoded in a computer readable medium.

DETAILED DESCRIPTION

A system and method for providing link, node, and PG policy based routing in PNNI based ATM networks are disclosed. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known components, circuits, methods, processes, procedures, protocols, networks, and systems have not been described in detail so as not to unnecessarily obscure aspects of the present invention. Embodiments of the present invention are discussed primarily in the context of a system and method for providing link, node, and PG policy based routing in PNNI based ATM networks.

Figure 6:
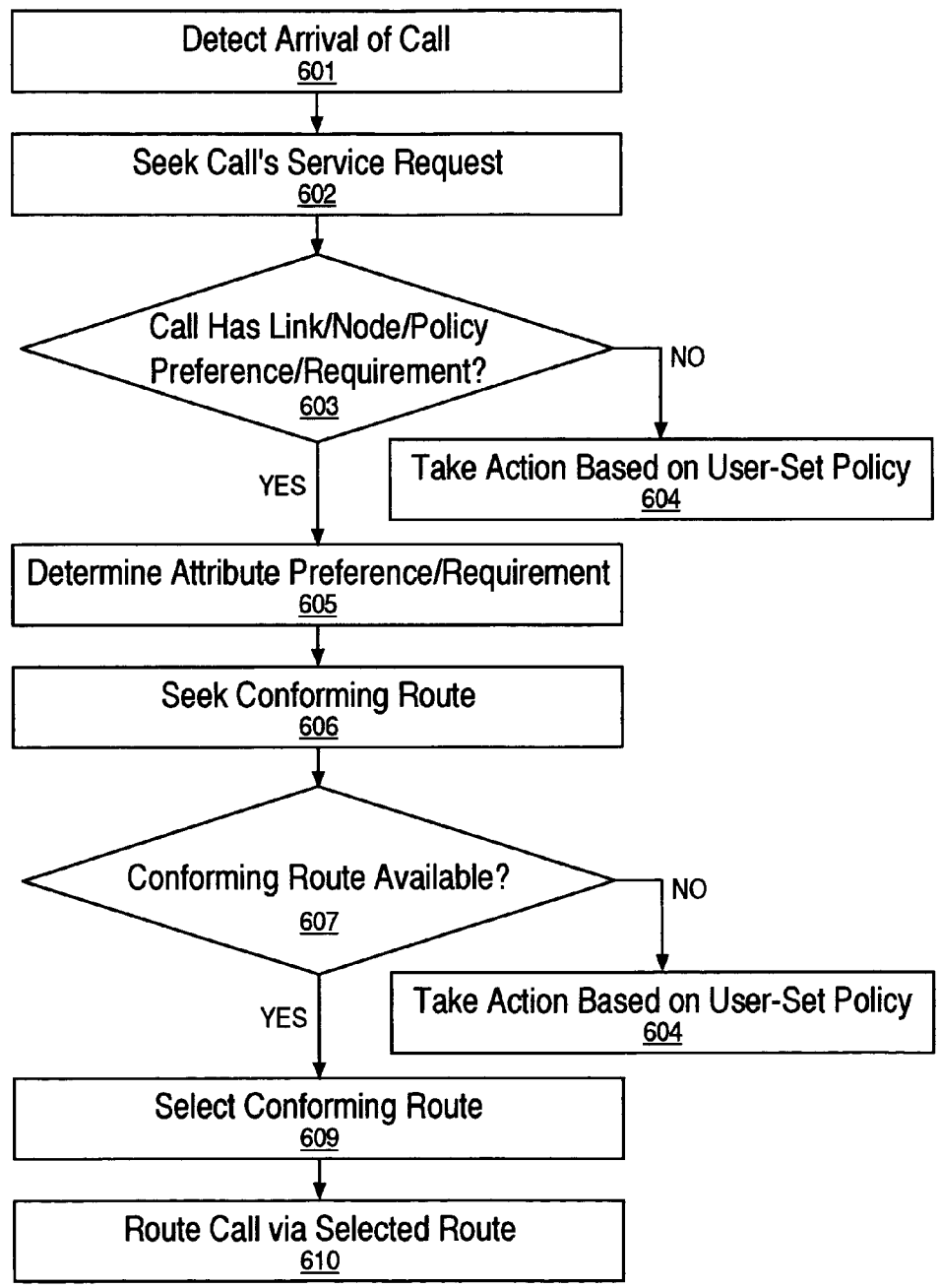
FIG. 6 is a flowchart of one exemplary computer implemented process for signaling and route lookup, according to one embodiment of the present invention.
Figure 7:
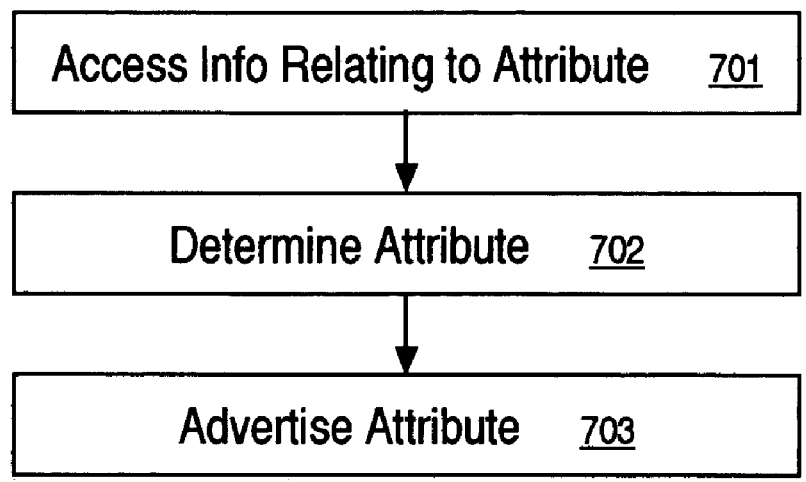
FIG. 7 is a flowchart of one exemplary computer implemented process for advertising routing capability, according to one embodiment of the present invention.
Figure 8:
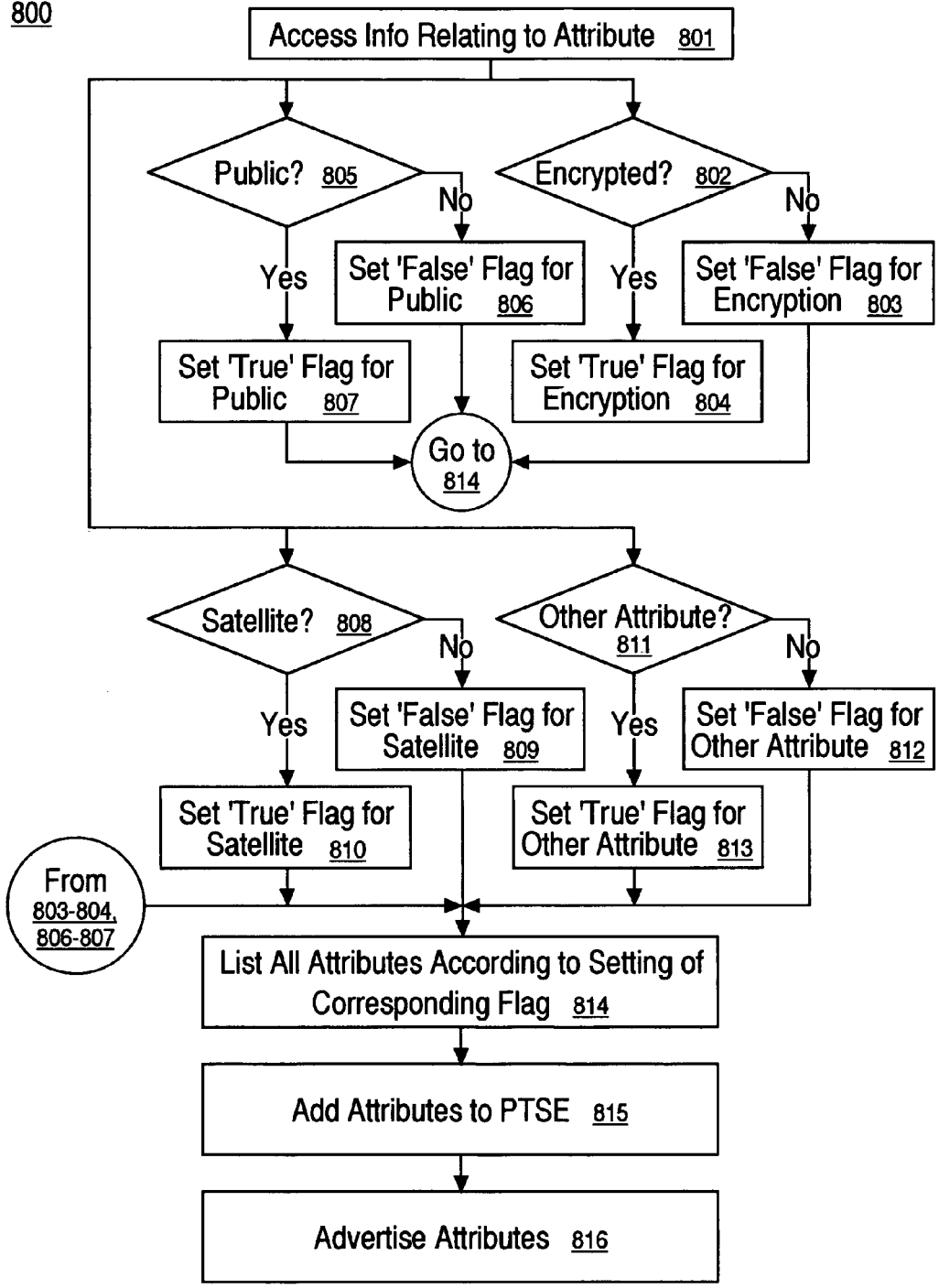
FIG. 8 is a flowchart of another exemplary computer implemented process for advertising routing capability, according to one embodiment of the present invention.

Certain portions of the detailed descriptions of embodiments of the invention, which follow, are presented in terms of exemplary computer implemented processes (e.g., processes 600-800 of FIGS. 6-8, respectively). Although specific steps are disclosed herein describing the operations of these computer implemented processes, such steps are exemplary. That is, embodiments of the present invention are well suited to performing various other steps or variations of the steps and/or sequence of steps recited in the flowcharts of the figures herein.

In one embodiment, such processes are carried out by processors and electrical/electronic components under the control of computer readable and computer executable instructions comprising code contained in a computer usable medium. The computer readable and computer executable instructions reside, for example, in code within a computer usable medium and used in the processor, data storage features, memory, registers and other components of a computer system for providing link, node, and PG policy based routing in PNNI based ATM networks. However, the computer readable and computer executable instructions may reside in any type of computer readable medium.

A computer system that provides link, node, and PG policy based routing in PNNI based ATM networks can comprise any kind of computer system. For example, the computer system can comprise a network control computer system, a telecommunications control computer system, a computer system deployed as a network device such as a switch, a workstation computer system, a main-frame computer system, or a supercomputer system, etc. Modules of the system for providing link, node, and PG policy based routing in PNNI based ATM networks can be implemented in software, firmware, and/or hardware or any combination of software, firmware, and/or hardware.

A system and method for providing link, node, and PG policy based routing in PNNI based ATM networks is disclosed. In one embodiment, a computer based system functions to signal and route calls and advertise routing pathways in the network according to capabilities and other attributes of links and nodes, and of peer group policies relating to the links. In one embodiment, a computer implemented method signals and routes a call in the network. Upon detecting the call's arrival, its service request is accessed. Upon determining that the service request relates to an attribute of a link of the network, a routing path is sought that conforms to the service request, as by accessing and examining information relating to the link and comparing the information to the service request. A conforming routing path is selected, and the call is routed via the selected routing path. In one embodiment, a computer implemented method advertises a route for a call in a network according to an attribute of the route. Data relating to the route's attribute is provided to a node, in one embodiment, as a system capability IG component of a PNNI topology exchange.

Therefore, the constraints of conventional network routing, which achieves routing based on one metric while limiting route selection based on another metric, are alleviated by an embodiment of the present invention. Thus, where conventional PNNI routing is achieved based on a single metric, an embodiment of the present invention allows routing to be optimized on the basis of one set of parameters but select routing paths based on some other parameters. Advantageously, this embodiment provides better routing opportunities in a greater number of routing scenarios. For instance, where routing through a PNNI network can be achieved on the basis of, for example, delay or cost, embodiments of the present invention allow routing decision making based on other factors, such as link, node, and peer group (PG) capabilities.

Exemplary PNNI ATM Network Platform

Figure 1:
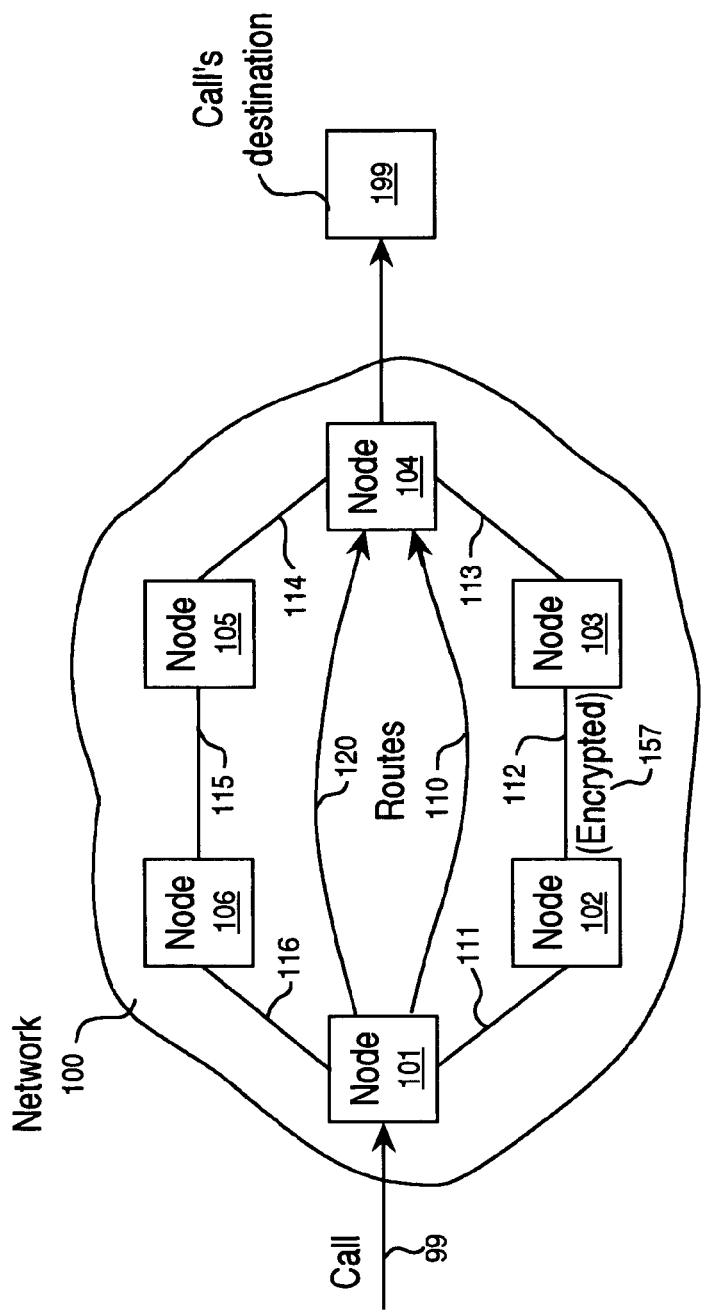
FIG. 1 depicts an exemplary PNNI ATM network, upon which an embodiment of the present invention can be deployed.

FIG. 1 depicts an exemplary PNNI ATM network 100, upon which an embodiment of the present invention can be deployed. Exemplary network 100 comprises nodes 101-106. Link 111 links nodes 101 and 102. Link 112 links nodes 102 and 103. Link 113 links nodes 103 and 104. Link 114 links nodes 104 and 105. Link 115 links nodes 105 and 106. Link 116 links nodes 106 and 101. A call 99 arriving at node 101 can be routed through network 100 to be passed to its destination 199. Call 99 can be routed via route 110. Propagating via the route 110, call 99 is passed from node 101, via link 111 to node 102. Node 102 passes call 99 via link 112 to node 103. Exemplary link 112 comprises an encrypted link. Thus, call 99 is encrypted by node 102 (e.g., by external devices inserted between the node and the physical transmission facility) prior to transmission via encrypted link 112 and is decrypted at node 103 prior to being passed on. Upon decrypting call 99, node 103 passes call 99 via link 113 to node 104, which can then transmit the call to its destination 199.

Call 99, arriving at node 101, can also be routed through network 100 via route 120. Propagating via the route 120, call 99 is passed from node 101, via link 116 to node 106. Node 106 passes call 99 via link 115 to node 105. Node 105 passes call 99 via link 114 to node 104, which can then transmit the call to its destination 199. Links 114-116 are not encrypted links. By routing call 99 via route 110, the call is encrypted for transmission over encrypted link 112. However, by routing call 99 via route 120, the call is not encrypted to flow over any of the links comprising that route.

Call 99 may include a service request (e.g., a requirement, or some other stricture, desire, etc.) to be encrypted, for instance, where the added security provided to the call by encryption is desirable. Thus, route 110 may be selected, to pass call 99 through network 100 to its destination 199, (e.g., where links 111 and 113 also comprise encrypted links). In one embodiment of the present invention, the selection of route 110 is based in part on link information 157 that link 112 is encrypted.

However, where call 99 includes a service request not to be passed via any encrypted links (e.g., to avoid delay, cost, increased error probability, and/or another parameter that may possibly characterize encryption to any degree), route 110 can not be selected. Instead, route 120 can pass call 99 to its destination 199. In one embodiment of the present invention, the selection of route 120 is based in part on link information 157 that link 112 (and thus route 110) is encrypted and/or that links 114-116 are not encrypted.

In the illustration discussed above, an embodiment of the present invention selects between route 110 and route 120 to pass call 99 through network 100 based on link information 157 that link 112 (and thus route 110) is encrypted and/or that links 114-116 are not encrypted. However, information characteristic of link 112, links 114-116, and other links and/or the nodes comprising network 100 can comprise the subject matter of link information 157. For instance, link information 157 can also characterize link 112 as a type of a satellite based link, as a public link type, a link having a user configurable and/or definable policy, a node policy, and/or a PG policy, and/or a link or node having any other characteristic and/or capability (e.g., QoS characteristics of a link).

A user configurable/definable link policy can include specifying a provider, such as 'Provider A' or 'Provider B', etc., and other link policies. A node policy can include 'Test node', 'Taking out of service', and other node policies. A PG policy can include 'Acquired company' and other PG policies.

Exemplary PNNI Information Relationships

Figure 2:
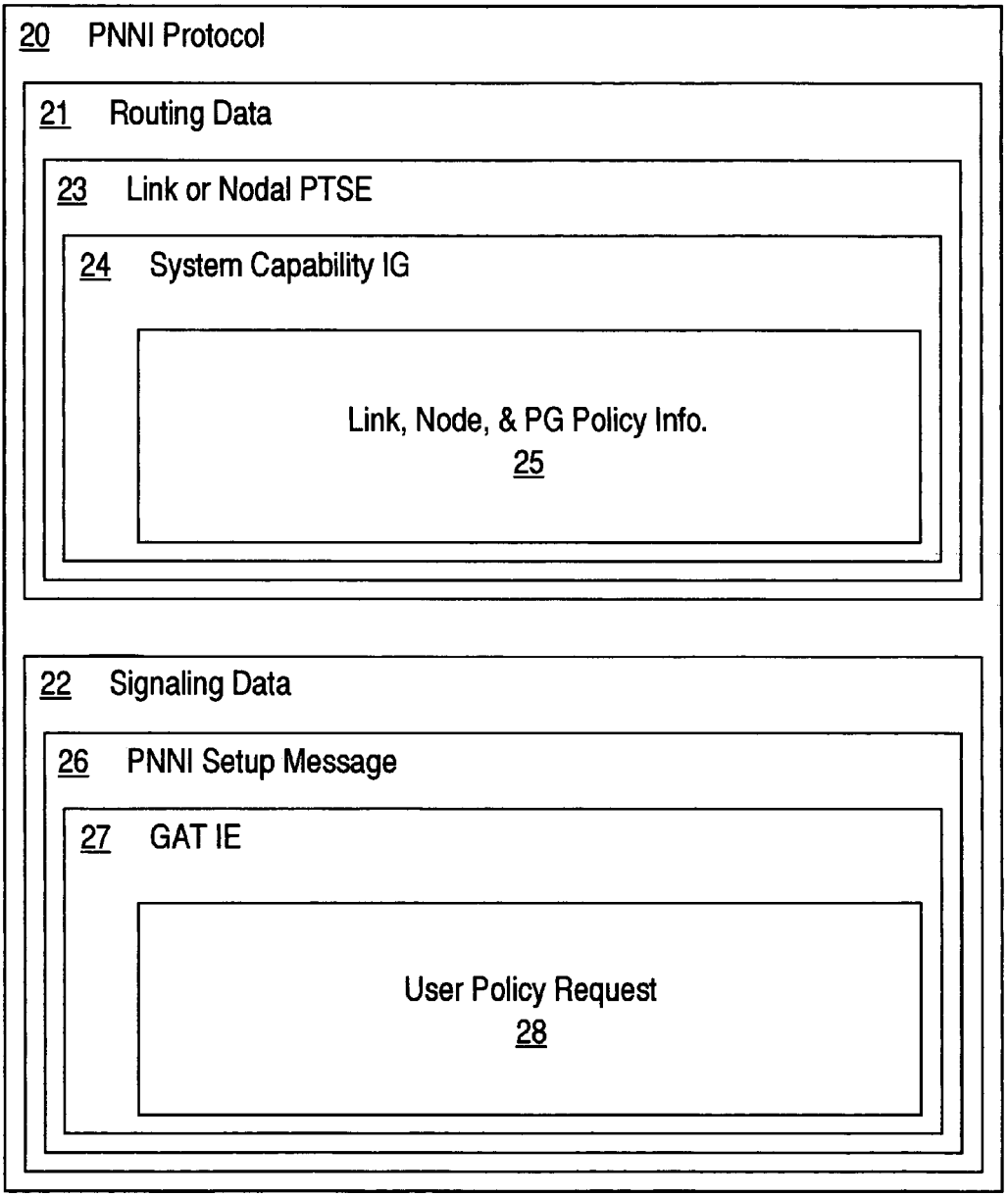
FIG. 2 depicts an exemplary data relationship within the PNNI, which can be utilized by an embodiment of the present invention.

FIG. 2 depicts an exemplary data relationship within PNNI protocol 20, which can be utilized by an embodiment of the present invention. In one embodiment, PNNI protocol 20 allows the presentation (e.g., exchange, advertising, signaling, etc.) of routing data 21 and signaling data 22. In one embodiment, routing data 21 comprises information 25 relating to a link type, node, or PG policy.

Link/node/PG policy information 25 is carried in an unrestricted system capability information group (IG) 22, as part of a PNNI horizontal link or nodal topology state element (PTSE) 23. System capabilities IG 24 functions to propagate system capabilities in a network without adversely affecting interoperability. System capabilities IG 24 can propagate any PTSE. Link, node, and PG policy information 25 is propagated, in one embodiment, as part of horizontal link IG and node IG PTSE 23, bundled in system capabilities IG 24.

Signaling data 22 allows the exchange of link, node, and/or PG policy information relating to a user policy request 28, such as a service request for handling a call, between multiple peer groups of a network. In one embodiment, user policy request 28 comprises connection link qualifier requirements, preferences, etc., and is carried using a generic application transport (GAT) information element (IE) 27. In one embodiment, the GAT IE 27 is carried in a PNNI signaling message, such as in a PNNI 'SETUP' message 26. PNNI SETUP message 26 and GAT IE 27 convey requested policy information relating to a specific call to the next PG, however in one embodiment, not for policy distribution.

Figure 3:
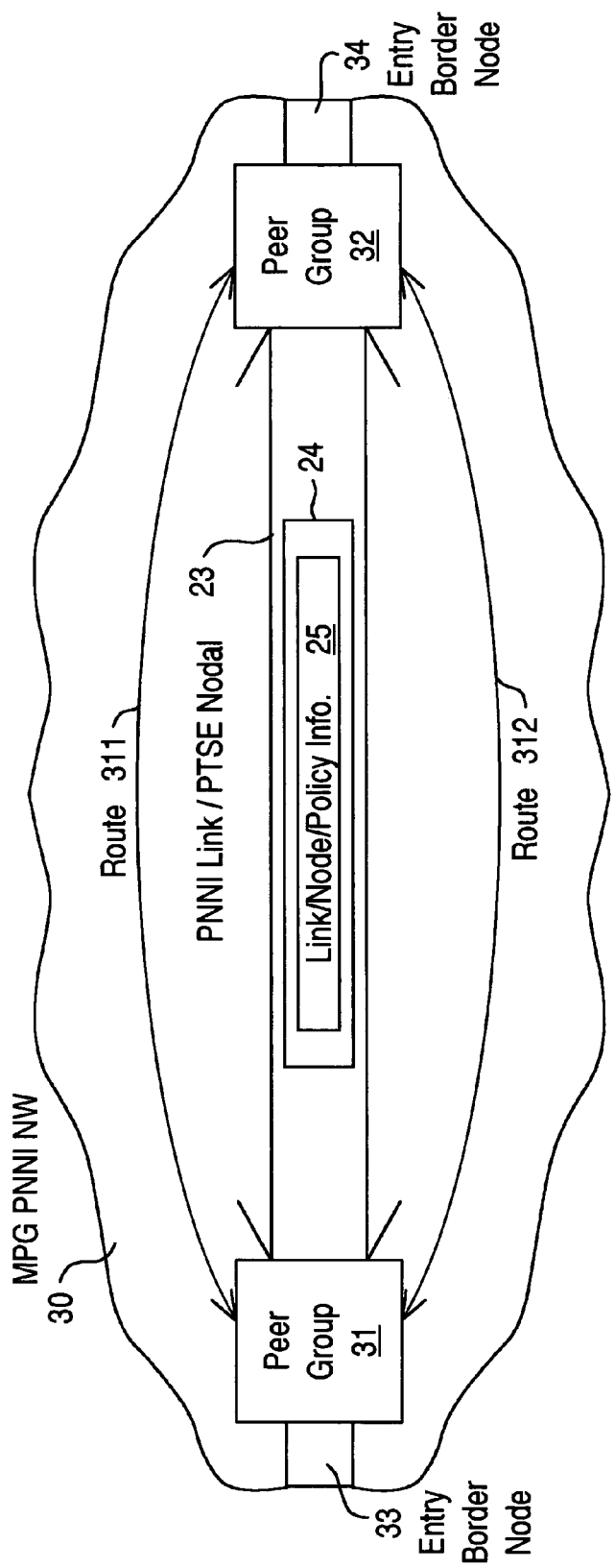
FIG. 3 depicts an exemplary MPG PNNI network, according to one embodiment of the present invention.

FIG. 3 depicts an exemplary multiple peer group (MPG) PNNI network 30, according to one embodiment of the present invention. MPG PNNI network 30 comprises a peer group 31 and a peer group 32. Peer group 31 is associated with an entry border node 33. Peer group 32 is associated with an entry border node 34. Within network 30, data traffic between peer group 31 and peer group 32 can be routed via a route 311 or a route 312.

For selecting between route 311 and route 312 for routing traffic, information comprising the capability and other characteristics of the links comprising each route are exchanged between the peer groups. For instance, the peer groups exchange information relating to which links comprising each route, e.g., within each peer group, are encrypted links and whether encryption is desired or not, which are satellite based and whether satellite based links are to be avoided or not, which are public links, etc. Each peer group comprising network 30, including peer groups 31 and 32, knows its own topology (e.g., stores and accesses information such as a detailed topology description), and the outside-and-uplinks thereto can comprise "virtual" links, which inherit properties characterizing its underlying real links.

In one embodiment, peer groups 31 and 32 exchange information relating to their links, nodes, and peer group policies 25 using PNNI Link and nodal PTSE 23. Referring again to FIG. 2, PNNI routing data 21 provide for transport of application specific information such as link/node/PG policy information 25 to be carried over the PTSE 23 as part of system capability IG 24. In one embodiment, PTSE 23 also exchanges policy attributes for selecting routes in entry border nodes 33 and 34.

In one embodiment, where a connection is configured with a particular link, node, or PG policy attribute's requirements, related information is transported using an organizational specific application type in GAT IE 27, for instance, using an organizational unique identifier (OUI), such as an OUI for Cisco Systems, Inc. Where an intermediate node comprising route 311 and/or route 312 does not have an information handling capability to understand GAT IE 27, the Application Type can indicate "reserved for an extension mechanism" and the 'pass along' bit is set.

In this embodiment, standard PNNI protocol capability is used, and is interoperable with PNNI protocol implementation, such as of multiple vendors. Where the PNNI implementation of a particular vendor does not interpret this information, it simply floods the information transparently. Border entry nodes 31 and 32 use the link policy attributes information present in GAT IE 27 to select routes within the other peer group (e.g., PG 32 for node 33; PG 31 for node 34). In one embodiment, data relating to the route's attribute can be provided to a node as a GAT IE component of a PNNI signaling setup message for multi-peer group networks, and advertised using PTSEs within a peer group.

Exemplary Platform

Figure 4:
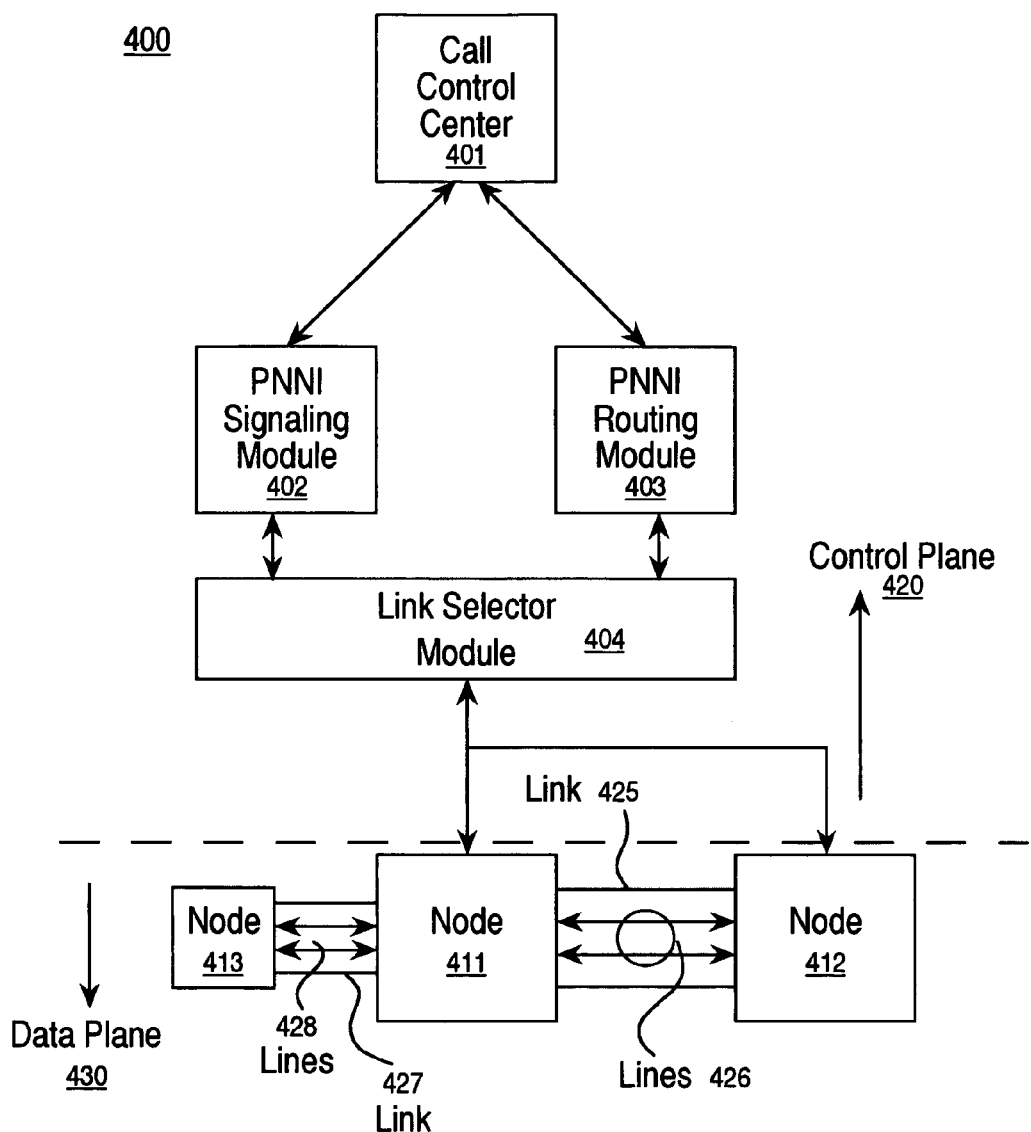
FIG. 4 depicts an exemplary PNNI control plane and data plane platform, upon which one embodiment of the present invention can be deployed.

FIG. 4 depicts an exemplary PNNI control plane and data plane platform 400, upon which one embodiment of the present invention can be deployed. A call control center 401 interacts with PNNI signaling module 402 and PNNI routing module 203 to monitor and control physical lines 426 and 428, comprising links 425 and 427, respectively, through a link selector module 404. Physical lines 426 and 427 comprise a plurality of individual lines that are configurable, for instance, as single virtual links 426 and 427 between nodes 411 and 412, and between nodes 411 and 413, respectively.

Control plane 420 comprises call control center 401, PNNI signaling module 402, PNNI routing module 403, and link selector module 404. Data plane 430 comprises the nodes 411-413, the links 425 and 427, and their constituent physical lines 428. In one embodiment, link selector module 404 comprises an interface between control plane 420 and data plane 430. Call control center 401 can interface with multiple PNNI signaling and routing modules and line drivers to control multiple links.

Exemplary platform 400 can comprise an element of a network such as network 300 (FIG. 3) above. Within such a network, platform 400 operates in one embodiment to select a route via link 425 or link 427 based on information relating to the capability and/or a characteristic of the respective links, nodes, and/or PG policy configuration. Both local and remote links can be selected, e.g., using source routing. This information, in one embodiment, is propagated between nodes 411, 412, and 413 via a PNNI PTSE message, as discussed above (e.g., FIG. 2, 3).

Characteristics of the links are communicated to call control center 401, such as by PNNI routing module 403. When call control center 401 receives advertisement of a link capability, such as by PNNI signaling module 402, it selects routing according to the information relating to the links, nodes, or PG policy. For example, where encryption is desired (or is to be avoided) or satellite links or public links are to be avoided, or the links of a particular provider selected, the characteristics and capabilities of the links and nodes and policies are thus communicated to the call control center 401. Advantageously, the information relating to the links, nodes, or PG policy provide flexibility to call control center 401 and allow the networks deploying an embodiment of the present invention with greater reliability.

Exemplary System

Figure 5:
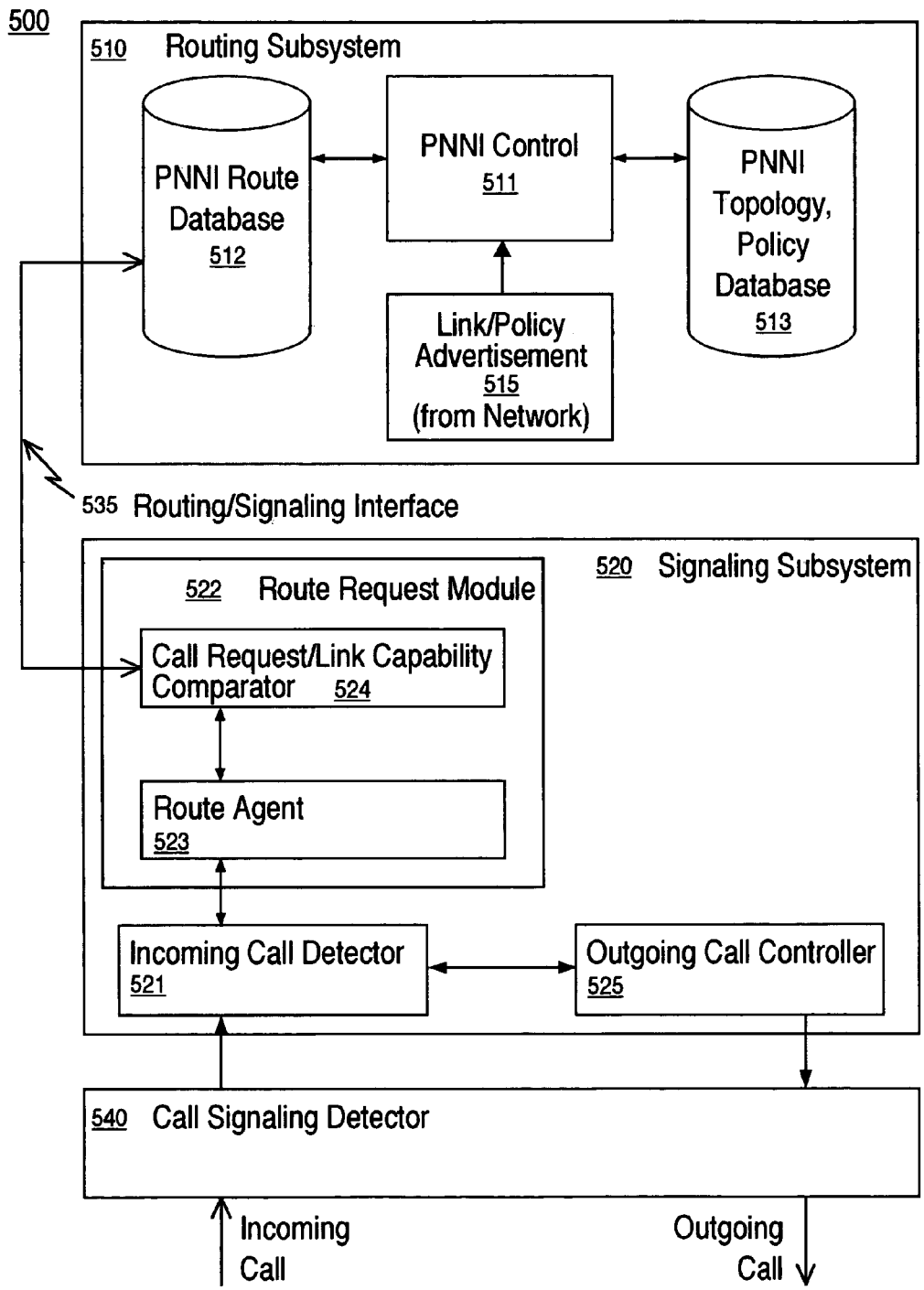
FIG. 5 depicts an exemplary system for routing and signaling, according to one embodiment of the present invention.

FIG. 5 depicts an exemplary system 500 for routing and signaling, according to one embodiment of the present invention. In one embodiment, system 500 is deployed within call control center 401 FIG. 4). System 500 comprises an incoming call detector module 521, which receives notification of the requests or requirements (e.g., a service request) associated with an incoming call from a call signaling module 540. In one embodiment, the function of call signaling module 540 is provided by PNNI call signaling module 402 (FIG. 4).

Incoming call detector module 521 processes the service request of the incoming call and passes the processed request to a route request module 522. Aspects of the processed service request relating to routing are handled by a route agent 523. Route agent 523 accesses information relating to routing the call according to its processed service request using a call request/link capability comparator 524. Comparator 524 accesses the route information via a routing/signaling interface 535. Comparator 524 compares the processed service request handled by route agent 523 to information relating to the characteristics and capabilities of the available links and nodes (e.g., and related PG policies) available for routing the call.

In one embodiment, this link, node, and PG policy information is extracted from a PNNI route database 512 in a routing subsystem 510. In one embodiment, the link, node, and PG policy information can be written to PNNI route database 512 by PNNI control module (e.g., PNNI controller) 511. In one embodiment, the information is provided to PNNI controller by link/policy advertiser (e.g., advertisement agent) 515. PNNI controller accesses information relating to PNNI topology, policy, and the like from a PNNI topology/policy database 513.

Upon comparing the processed call service request to the link, node, and PG policy information accessed from PNNI route database 512 via routing/signaling interface 535, the call request-link capabilities comparator 524 passes the processed comparison to an outgoing call controller 525. In one embodiment, the processed comparison is passed to outgoing call controller 525 using incoming call detector 521, which processes the comparison for the incoming call and sends corresponding routing instructions to outgoing call controller 525. Outgoing call controller 525 performs a call dispatching function, such as controlling call signaling module 540 to route the call based on the routing instructions. In one embodiment, signaling subsystem 520 provides a call handling function.

In one embodiment, the connections for routing the call are thus configured with the link, node, PG, and other types, characteristics, and capabilities the call prefers, is permitted, etc., to traverse or avoid. In one embodiment, a user specifies whether to use or avoid certain such attributes, e.g., by programming the service request for its call.

For instance, a particular connection can be configured by outgoing call controller 525 with call signaling module 540, in response to the service request, to only use (or e.g., to avoid) encrypted links. Where a route is correspondingly selected for the call's connection, a computer implemented routing process, controlled for instance according to an algorithm, ensures that a link selected for the path, in one embodiment multiple (e.g., some or all) links, selected for the routing path are encrypted. System 500 can thus be advantageously deployed in support of secure communications, such as for defense and certain commercial and business related applications. Also for instance, where a connection is configured to avoid satellite based links, such links will not be selected, e.g., by the source node computing the PNNI routing path.

System 500 can route calls based on a link's QoS capability. For instance, the attribute can relate to a QoS level that the link is capable of providing. The link may be capable of providing a high QoS, such as a constant bit rate (CBR), or the link may only be capable of providing QoS at a lower level than CBR, such as, in decreasing order of QoS level, real-time variable bit rate (rt-VBR), non-real-time variable bit rate (nrt-VBR), available bit rate (ABR), or the link can be constrained to provide only an unspecified bit rate (UBR). A call's service request, such as where the call comprises voice traffic, videoconferencing data, or other time sensitive data may specify a CBR for routing.

Thus, in one embodiment, computer implemented processes relating to routing, and e.g., an algorithm on which such a process may be based, comprises removing links and nodes that do not match the service request or other requested attributes for the call. Upon removing such links from among the call's possible routing paths, routing the call proceeds, in one embodiment, by performing shortest path first (SPF) routing, on demand routing, or another routing protocol.

In one embodiment, attributes including link and node "color" can be separately specified, advantageously providing significant flexibility to routing control in PNNI networks and routing aspects relating to network architecture. Other attributes relating to links, nodes, and policies can be used to include or exclude a link. In one embodiment, higher level networks such as a logical group node (LGN) can apply their own relevant attributes to this signaling and routing process, for instance, to include or exclude complete peer groups.

System 500 thus functions to route the incoming call according to its requested service, based on the information relating to the relevant characteristics and capabilities of the available links and nodes and policies. Advantageously, system 500 thus comprises a signaling and route lookup capability. Further, advantageously, system 500 provides routability based on a variety of (e.g., any) metrics. Exemplary system 500 further comprises route advertising capability.

In one embodiment, advertiser 515 obtains information relating to link and node characteristics and capabilities and policies from the various components (e.g., peer groups, links, nodes, etc.) comprising a network (e.g., network 30; FIG. 3). For instance, each peer group comprising the network, knows its own topology and policies, their outside-and-uplinks can comprise "virtual" links, which inherit properties characterizing its underlying real links, and links, nodes, and other network components are aware of (e.g., stores and accesses information relating to) their own characteristics.

Such network components can exchange information relating to their attributes, links, nodes, and policies, etc. in the system capability IG of a PNNI Link or nodal PTSE (e.g., link/node/peer group policy information 25, IG 24, PTSE 23; FIG. 3). In one embodiment, this information is advertised, such as by flooding to link/policy advertisement module 515. Advertisement module 515 provides the information to PNNI controller 511, which can store the information, such as for reference, accessing by signaling subsystem 520, etc. In one embodiment, PNNI controller 511 stores the information in PNNI route database 512, where it is accessible to signaling subsystem 520, and/or in PNNI topology/policy database 513, which can provide a persistent topology database function.

PNNI controller 511, in one embodiment, records the advertised information as a PTSE. In one embodiment, the link, node, and PG policy information is provided to call request-link capabilities comparator 524, for use in signaling and call lookup functions. Information relating to link and node characteristics and capabilities and policies can also uploaded to a network management entity, such as a NetWare™ Management System (NMS) module, and/or displayed, such as from the command line interface (CLI) of a network switch or other network component.

Thus, a source node comprising any part of a system is allowed to access information relating to any routing attribute, to use it to understand the topology characterizing the network, the nature of another node, link, etc., and use that information in making decisions relating to routing. System 500 therefore advertises an attribute, a set of capabilities, and policy relating to a link and node. On a call by call basis, system 500 considers these attributes, capabilities, etc., for selecting a route for a call, and on that basis communicates to the network the attributes and capabilities requested for a call.

Exemplary Processes

Exemplary Processes for Signaling and Route Lookup

FIG. 6 is a flowchart of an exemplary computer implemented process 600 for signaling and route lookup, according to one embodiment of the present invention. Process 600 begins with a step 601, wherein a call's arrival is detected. In step 602, a service request associated with the call is accessed.

In step 603, it is determined whether the call has (e.g., the service request comprises) a preference or requirement for a link, node, PG policy, or other attribute relating to the call's routing. If not, in step 604 action is taken based on a user set (e.g., selected, programmed, etc.) policy. For instance, the call can be routed according to a protocol such as SPF or on demand routing. In another embodiment, the call fails. Where it is determined that the call has such a preference or requirement, in step 605 the link, node, PG policy, or other attribute relating to the call's routing is determined.

In step 606, a route conforming to the preference or requirement is sought. In one embodiment, this is performed by comparing the preference or requirement of the call to information relating to an attribute such as the capability of a link and/or node, or a PG policy. In step 607, it is determined whether such a conforming route is available.

If not, then in step 604, action is taken based on a user set policy. For instance, the call can be routed according to a protocol such as SPF or on demand routing. In another embodiment, the call fails. Where a call fails and the network is comprised of switched permanent virtual circuits (SPVC), the call can be re-tried, e.g., using normal SPF.

Where it is determined that a conforming route is available, in step 609 that route is selected for passing the call along. In step 610, the call is routed along that route according to that selection, completing process 600.

Exemplary Processes for Advertising Link Capability

FIG. 7 is a flowchart of an exemplary computer implemented process 700 for advertising routing capability, according to one embodiment of the present invention. Process 700 begins with step 701, wherein information relating to an attribute of a routing component (e.g., a link, node, PG policy, etc.) is accessed.

In one embodiment, such information is accessed from a link, node, PG policy capability database, a persistent topology database, another information repository, and/or a link, node, or another network component itself. In step 702, an attribute, capability, etc., of the routing component is determined. In step 703, this attribute is advertised to another node of the network, to an advertisement agent for a PNNI controller, etc., e.g., in the system capability IG of a PNNI PTSE. Upon advertising the attribute, process 700 can be complete, or can be repeated for another (e.g., each) node and link comprising the network.

FIG. 8 is a flowchart of an exemplary computer implemented process 800 for advertising routing capability, according to one embodiment of the present invention. Process 800 begins with step 801, wherein information relating to one or more attributes of a routing component (e.g., a link, node, PG policy, etc.) is accessed. In one embodiment, such information is accessed from a link, node, PG policy capability database, a persistent topology database, a PNNI topology/policy database, a PNNI route database, or another information repository.

In step 802, it is determined whether the link is encrypted. If not, in step 803, a 'False' flag is set for the encryption attribute. Where it is determined that the link is encrypted, in step 804 a 'True' flag is set for the encryption attribute.

In step 805, it is determined whether the link comprises a public link. If not, in step 806, a 'False' flag is set for the public attribute. Where it is determined that the link does comprise a public link, in step 807 a 'True' flag is set for the public attribute.

In step 808, it is determined whether the link is satellite based. If not, in step 809, a 'False' flag is set for the satellite basing attribute. Where it is determined that the link is satellite based, in step 810, a 'True' flag is set for the satellite basing attribute.

Links comprising a network can be characterized in various other ways, for instance, by its QoS capability or coloring. Any other characteristic (e.g., QoS, color, etc.) relating to a link can comprise an attribute that can be considered by process 800. In step 811, it is determined whether the link has another such attribute. If not, in step 812, a 'False' flag is set for the attribute under consideration. Where it is determined that the link has another such attribute, in step 813 a 'True' flag is set for that attribute.

Where a flag is set corresponding to an attribute, e.g., in steps 803-804, 806-807, 809-810, and/or 812-813, in step 814 the attributes are listed (e.g., compiled, stored, prioritized, and/or analyzed, etc.) according to the setting of the flag corresponding to each attribute. In step 815, each attribute listed is added to a PTSE, for instance in a system capability IG.

In step 816, the attribute is advertised to another node comprising the network, for instance, by providing the PTSE listing the attributes. Advertising the attribute completes process 800, which can be repeated for another (e.g., each) node and link comprising the network.

Thus, a source node comprising any part of a system is allowed to access information relating to any routing attribute, to use it to understand the topology characterizing the network, the nature of another node, link, etc., and use that information in making decisions relating to routing. Further, an attribute, a set of capabilities, and policy relating to a link and node are advertised by one node to another.

A system and method for providing link, node, and PG policy based routing in PNNI based ATM networks, is thus described. While the present invention has been described in particular embodiments, it should be appreciated that the present invention should not be construed as limited by such embodiments, but rather construed according to the following claims and their equivalents.

What is claimed is:

1. An apparatus for processing a call having associated therewith a remotely-computed virtual circuit, comprising:
   one or more processors; and
   a memory containing instructions executable by the processors, the processors when executing the instructions operable to:
      receive, at an intermediary node that comprises part of the remotely-computed virtual circuit, a service request for the call, the service request sent according to a protocol standard;
      analyze, at an intermediary node, the contents of the service request to identify any information elements marked as optional extensions to the protocol standard;
      process the identified information elements at the intermediary node to determine whether there is included therein an indication of whether at least one link type selected from the group comprising encrypted links, satellite links, and public infrastructure links is preferred or non-preferred for the call;
      if the indication is included, compare a table stored on the intermediary node to routing information for the remotely-computed virtual circuit to determine whether links that are within intermediary node's flooding group and utilized by the remotely-computed virtual circuit correspond to the indication; and
      assign a new virtual circuit for the call if the comparison indicates that the remotely-computed virtual circuit does not correspond to the indication, the new virtual circuit using at least one link from the intermediary node's flooding group that was not included in the remotely-computed virtual circuit;
   wherein the service request is interoperable with both intermediary nodes that are configured for support with the organization's optional extension and intermediary nodes that support the asynchronous transfer mode protocol but are not configured with support for the organization's optional extension;
   wherein the information element of the service request comprises:
      a predefined application type field to indicate that the information element is associated with an optional extension to the asynchronous transfer mode protocol; and
      a pass along bit to prevent nodes that do not understand the information element from dropping or rejecting the signaling message.

2. The apparatus of claim 1 wherein the new virtual circuit is computed at the intermediary node using a shortest path first routing protocol or an on-demand routing protocol, or combinations thereof.

3. The apparatus of claim 2 wherein the shortest path first routing protocol or the on-demand routing protocol, or combinations thereof are processed independent of information indicating whether a link type is an: encrypted link, satellite link, or public infrastructure link, or combinations thereof.

4. The apparatus of claim 1 wherein the protocol is an asynchronous transfer mode protocol and wherein the information element comprises organization identification data, the identification data uniquely identifying an organization providing the optional extension wherein the presence of the identification data causes a intermediary node that is not configured with support for the organization's optional extension to flood the information element within its flooding group regardless of whether the intermediary node is capable of selecting links according to the indication.

5. The apparatus of claim 1 wherein the indication may be compared to a plurality of link type indicium wherein indicium used for determining corresponding links in a local intermediary node's flooding group is different than indicium used for determining corresponding links in a remote node's flooding group.

6. An apparatus for processing a call having associated therewith a remotely-computed virtual circuit, comprising:
   one or more processors; and
   a memory containing instructions executable by the processors, the processors when executing the instructions operable to:
   receive, at a border node of a flooding domain that comprises part of the remotely-computed virtual circuit, a service request for the call, the service request sent according to a protocol standard;
   analyze, at the border node, the contents of the service request to identify any information elements marked as optional extensions to the protocol standard;
   process the identified information elements at the border node to determine whether there is included therein an indication of whether at least one link type selected form the group comprising encrypted links, satellite links, public infrastructure links, policy links, or predefined quality of service links is preferred or non-preferred for the call;
   if the indication is included, compare a topology database stored on the border node to routing information for the remotely-computed virtual circuit to determine whether links that are within the border node's flooding domain and utilized by the remotely-computed virtual circuit correspond to the indication; and
   assign a new virtual circuit for the call if the comparison indicates that the remotely-computed virtual circuit does not correspond to the indication, the new virtual circuit using at least one link from the border node's flooding domain, the assigned link being one that was not included in the remotely-computed virtual circuit;
   wherein the service request is interoperable with both border nodes that are configured for support with the organization's optional extension and border nodes that support the asynchronous transfer mode protocol but are not configured with support for the organization's optional extension;
   wherein the information element of the service request comprises:
      a predefined application type field to indicate that the information element is associated with an optional extension to the asynchronous transfer mode protocol; and
      a pass along bit to prevent nodes that do not understand the information element from dropping or rejecting the signaling message.

7. The apparatus of claim 6 wherein the new virtual circuit is computed at the border node using a shortest path first routing protocol or an on-demand routing protocol, or combinations thereof.

8. The apparatus of claim 7 wherein the shortest path first routing protocol or an on-demand routing protocol, or combinations thereof is processed using information independent of topology database information used to determine whether a link type is an: encrypted link, satellite link, public infrastructure link, policy link, or predefined quality of service link or combinations thereof.

9. The apparatus of claim 6 wherein the protocol is an asynchronous transfer mode protocol and wherein the information element comprises organization identification data, the identification data uniquely identifying an organization providing the optional extension wherein the presence of the identification data in the identified field causes a border node that is not configured with support for the organization's optional extension to flood the information element within its flooding domain regardless of whether it is capable of selecting links according to the indication.

10. The apparatus of claim 6 wherein the indication may be compared to a plurality of link type indicium wherein an indicium used for determining corresponding links in a local border node's flooding domain is different than indicium used for determining corresponding links in a remote border node's flooding domain.

* * * * *

UNITED STATES PATENT AND TRADEMARK OFFICE
CERTIFICATE OF CORRECTION

PATENT NO.         : 7,539,176 B1
APPLICATION NO.    : 10/817253
DATED              : May 26, 2009
INVENTOR(S)        : Chellappa et al.

It is certified that error appears in the above-identified patent and that said Letters Patent is hereby corrected as shown below:

At column 13, line 41, please replace "type selected form" with --type selected from--.

Signed and Sealed this

Twenty-ninth Day of September, 2009

David J. Kappos
*Director of the United States Patent and Trademark Office*